(12) United States Patent
Nied et al.

(10) Patent No.: US 11,535,538 B2
(45) Date of Patent: Dec. 27, 2022

(54) ANTIFOAM FORMULATIONS FOR THE THERMAL DESALINATION PROCESS OF WATER

(71) Applicant: SOLENIS TECHNOLOGIES, L.P., Wilmington, DE (US)

(72) Inventors: Stephan Nied, Neustadt (DE); Helena Kondardi, Ludwigshafen (DE); Lisa Marie Winzen, Kindsbach (DE)

(73) Assignee: Solenis Technologies, L.P., Wilmington, DE (US)

( * ) Notice: Subject to any disclaimer, the term of this patent is extended or adjusted under 35 U.S.C. 154(b) by 103 days.

(21) Appl. No.: 16/340,988

(22) PCT Filed: Oct. 4, 2017

(86) PCT No.: PCT/EP2017/075199
§ 371 (c)(1),
(2) Date: Apr. 10, 2019

(87) PCT Pub. No.: WO2018/069111
PCT Pub. Date: Apr. 19, 2018

(65) Prior Publication Data
US 2019/0256389 A1    Aug. 22, 2019

(30) Foreign Application Priority Data
Oct. 10, 2016 (EP) .................................. 16193125

(51) Int. Cl.
*C02F 1/68* (2006.01)
*B01D 19/04* (2006.01)
(Continued)

(52) U.S. Cl.
CPC ............ *C02F 1/68* (2013.01); *B01D 19/0404* (2013.01); *B01D 19/0409* (2013.01);
(Continued)

(58) Field of Classification Search
CPC ........... C08L 71/02; C08L 83/04; C08K 5/41
See application file for complete search history.

(56) References Cited

U.S. PATENT DOCUMENTS

| 5,741,947 A | 4/1998 | Wolf et al. |
| 6,701,940 B2 | 3/2004 | Tsibouklis et al. |
| (Continued) | | |

FOREIGN PATENT DOCUMENTS

| CN | 102716599 A | 10/2012 |
| CN | 104353265 A | 2/2015 |
| (Continued) | | |

OTHER PUBLICATIONS

ISA EPO, International Search Report and Written Opinion issued in International Application No. PCT/EP2017/075199, dated Jan. 11, 2018.

(Continued)

*Primary Examiner* — Clare M Perrin
(74) *Attorney, Agent, or Firm* — Lorenz & Kopf, LLP (57) ABSTRACT

Formulation F comprising
A) 50 to 90 parts by weight of at least one block copolymer P of ethyleneoxide and propylene oxide,
B) 0.5 to 10 parts by weight of at least one salt of an alkyl sulfate S,
C) 0.05 to 0.5 parts by weight of a composition C comprising
  C1) 5 to 10 parts by weight of at least one polydimethylsiloxane bearing only terminal alkyl groups,
  C2) 1 to 3 parts by weight of at least one polydimethylsiloxane bearing at least alkoxylated hydroxy group,
  C3) at least one solvent,
wherein said formulation F is an aqueous formulation.

9 Claims, 1 Drawing Sheet

(51) Int. Cl.
*C08K 5/41* (2006.01)
*C08L 71/02* (2006.01)
*C08L 83/04* (2006.01)
*C02F 1/08* (2006.01)
*C02F 103/08* (2006.01)

(52) U.S. Cl.
CPC ............ *B01D 19/0422* (2013.01); *C08K 5/41* (2013.01); *C08L 71/02* (2013.01); *C08L 83/04* (2013.01); *C02F 2103/08* (2013.01); *C02F 2303/12* (2013.01); *C02F 2305/00* (2013.01)

(56) References Cited

U.S. PATENT DOCUMENTS

| | | | | |
|---|---|---|---|---|
| 2014/0371317 | A1* | 12/2014 | Aliyar | ............... C08L 83/04 514/567 |
| 2015/0240424 | A1 | 8/2015 | Chao et al. | |
| 2017/0204266 | A1* | 7/2017 | Kennedy | ................ A61K 8/894 |

FOREIGN PATENT DOCUMENTS

| | | | |
|---|---|---|---|
| CN | 104703666 | A | 6/2015 |
| CN | 105347416 | A | 2/2016 |
| CN | 105498300 | A | 4/2016 |
| DE | 10243361 | A1 | 4/2004 |
| JP | H05285306 | A | 11/1993 |
| RU | 2506306 | C2 | 2/2014 |
| WO | 199521013 | A1 | 8/1995 |
| WO | 03031550 | A1 | 4/2003 |
| WO | 2010091044 | A2 | 8/2010 |
| WO | 2014058832 | A1 | 4/2014 |
| WO | 2016164296 | A1 | 10/2016 |

OTHER PUBLICATIONS

M.H. Auerbach et al., "Foam Control Additives in MSF Desalination", Desalination., Nov. 1, 1981, p. 159-168, vol. 38.

Imam M et al, "Studies on a polyoxypropylene glycol-based antifoaming agent in MSF plants", Desalination, Elsevier, Amsterdam, NL, Jul. 10, 2000, p. 187-196, vol. 129, No. 2.

Patent of the Cooperation Council for the Arab States of the Gulf, Examination Report issued in Application No. GC 2017-34091, dated Mar. 26, 2019.

Basov, N.I. et al.: Kontrol katshestva polimernykh materialov [Quality control of polymeric materials], ed. by V.A. Barginsky, 2nd revised edition, Leningrad, Publishing house "Khimiya" [Chemistry], 1990, p. 112.

R.R. Gabitov et al: Issledovanije ustoitshivosty emulsii rapsovovo masla i etilovovo spirta, polutshennoi metodom ultrazvukovovo dispergierovanija [Stability study of an emulsion of rapeseed oil and ethyl alcohol obtained by ultrasonic dispersing], Vestnik kasanskovo tekhnikologitscheskovo universiteta [Bulletin of the Technological University Kazan], 2012, vol. 15, No. 7, p. 129-132.

A.A. Yakovlev et al: Issledovanije vlijanija raslitschnykh reagentov na rasrushenije pen i predupreshdenije penoobrasovanija u burovykh rastvorov [Study of the effect of different reagents on the degradation of foam and the prevention of foam formation in drilling solutions], PNIPU Bulletin, Geology, Oil, Gas and Mining Matters, 2015, 15.

* cited by examiner

ANTIFOAM FORMULATIONS FOR THE THERMAL DESALINATION PROCESS OF WATER

CROSS-REFERENCE TO RELATED APPLICATION

This application is a U.S. National-Stage entry under 35 U.S.C. § 371 based on International Application No. PCT/EP2017/075199, filed Oct. 4, 2017, which was published under PCT Article 21(2) and which claims priority to European Application No. 16193125.8, filed Oct. 10, 2016, which are all hereby incorporated in their entirety by reference.

BACKGROUND

Defoamer agents play an important role in many industrial processes. Especially in thermal desalination processes for water the formation of foam may limit the efficiency of such processes. It is therefore of high importance to efficiently control the formation foam. On the other hand such thermal desalination pose especially high challenges to defoamer agents due to the technical complexity of such processes.

While many commercially available defoamers are available, there is a constant need for improved defoamers that can control the formation of foam effectively, efficiently and at low concentrations of defoamers. Also, the defoamer needs to be miscible with water.

M. H. Auerbach et al. (Desalination, 38 (1981), 159-168) disclose foam control agents based on polyglycol alkyl ethers.

BRIEF SUMMARY

The present disclosure is directed to formulations F comprising
  A) from about 50 to about 90 parts by weight, based on the total weight of the formulation, of at least one block copolymer P of ethyleneoxide and propylene oxide,
  B) from about 0.5 to about 10 parts by weight, based on the total weight of the formulation, of at least one salt of an alkyl sulfate S,
  C) from about 0.05 to about 0.5 parts by weight, based on the total weight of the formulation, of a composition C comprising
    C1) from about 5 to about 10 parts by weight, based on the total weight of the composition, of at least one polydimethylsiloxane bearing only terminal alkyl groups,
    C2) from about 1 to about 3 parts by weight, based on the total weight of the composition, of at least one polydimethylsiloxane bearing at least one alkoxylated hydroxy group,
    C3) at least one solvent,
  wherein said formulation F is an aqueous formulation.

The present disclosure is further directed to the use of formulations F as defoamer agents, especially in thermal desalination processes.

BRIEF DESCRIPTION OF THE DRAWINGS

The present disclosure will hereinafter be described in conjunction with the following drawing figure, wherein like numerals denote like elements, and wherein.

DETAILED DESCRIPTION

The following detailed description is merely exemplary in nature and is not intended to limit the disclosure or the application and uses of the subject matter as described herein. Furthermore, there is no intention to be bound by any theory presented in the preceding background or the following detailed description.

The objective of the present disclosure was to provide new formulations that form stable mixtures with water and that can efficiently control the formation of foam, especially in thermal desalination applications.

This objective was reached by formulations F comprising
  A) from about 50 to about 90 parts by weight of at least one block copolymer P of ethyleneoxide and propylene oxide,
  B) from about 0.5 to about 10 parts by weight of at least one salt of an alkyl sulfate S,
  C) from about 0.05 to about 0.5 parts by weight of a composition C comprising
    C1) from about 5 to about 10 parts by weight of at least one polydimethylsiloxane bearing only terminal alkyl groups,
    C2) from about 1 to about 3 parts by weight of at least one polydimethylsiloxane bearing at least one alkoxylated hydroxy group,
    C3) at least one solvent,
  wherein said formulation F is an aqueous formulation.

In one preferred embodiment, formulation F comprises
  A) from about 50 to about 90% by weight of at least one block copolymer P of ethyleneoxide and propylene oxide,
  B) from about 0.5 to about 10% by weight of at least one salt of an alkyl sulfate S,
  C) from about 0.05 to about 0.5% by weight of a composition C comprising
    C1) from about 5 to about 10% by weight of at least one polydimethylsiloxane bearing only terminal alkyl groups,
    C2) from about 1 to about 3% by weight of at least one polydimethylsiloxane bearing at least one alkoxylated hydroxy group,
    C3) at least one solvent,
  D) from about 10 to about 49.45% by weight of water.

Formulations F are mixtures that are normally clear and show no phase separation over long periods of time at room temperature. Formulations F can be considered oil-in-water emulsions, sometimes also referred to as oil-in-water microemulsions. In many cases Formulations have the outer appearance of a clear solution. Thus when reference is made herein to formulation F as a "solution", this shall be understood to include the described mixtures or emulsions.

Block copolymers P are block copolymers of ethylene oxide (EO) and propylene oxide (PO). Preferably block copolymers P have an average molecular mass Mw from about 1000 to about 10000 g/mol, preferably from about 1500 to about 8000 g/mol, more preferably from about 2000 to about 6000 g/mol.

In one preferred embodiment, block copolymer P is a block copolymer of the structure PEO-PPO-PEO that are not etherified at their terminal positions (thus bearing OH groups in their terminal positions) with an average molar mass MW of from about 1000 to about 3000 g/mol (all MW of block copolymers P cited herein are calculated from the OH number as determined according to DIN 53240-1:2013-06).

In one preferred embodiment, block copolymer P is a block copolymer PEO-PPO-PEO with an average molar mass MW of from about 3000 to from about 4000 g/mol.

In one preferred embodiment, block copolymer P is a block copolymer PEO-PPO-PEO with an average molar mass MW of from about 4000 to from about 5000 g/mol.

In one preferred embodiment, block copolymer P is a block copolymer PEO-PPO-PEO with an average molar mass MW of from about 5000 to from about 6000 g/mol.

In one embodiment block copolymer P is a triblock surfactant represented by the general formula or where a, b, and c each represent the number of ethyleneoxy or propyleneoxy units in each of the blocks; and where $R^3$ and $R^4$ are independently hydrogen, an alkyl group with from about 1 to about 18 carbon atoms, a hydroxyalkyl group with from about 1 to about 18 carbon atoms or a mixture thereof.

Preferred block copolymers P have an average molecular weight MW of from about 1000 to about 6000, more preferably from about 1500 to about 4500 g/mol. In one embodiment, block copolymers P have an average molecular weight MW of from about 1000 to about 2000 g/mol.

In another embodiment, block copolymer P have an average molecular weight of from about 2000 to about 4000. Block copolymers P are preferably comprised of from about 20% to about 60% by weight of polyoxyethylene (PEO) blocks, and more preferably from about 25% to about 50%.

In one embodiment, block copolymer P comprise only ethylene oxide and propylene oxide and comprise a number average of from about 0.1 to about 40 units of propylene oxide preferably 1 to 10 and even more preferably from about 1.5 to about 5 units and the number average molar ratio of propylene oxide to ethylene oxide is from about 40:1 to about 1:400, preferably from about 40:1 to about 1:300, more preferably 5:1 to about 1:100 and especially preferably from about 5:1 to1:50. In another embodiment, the number average molar ratio of propylene oxide to ethylene oxide is from about 1:40 to 1:1 or from about 1:35 to about 1:1.

In one embodiment, polymers P have a content of EO of from about 5 to about 15% by weight.

In one embodiment, polymers P have a content of EO of from about 8 to about 12% by weight.

In one embodiment, polymers P have a content of EO of from about 15 to about 25% by weight.

In one embodiment, polymers P have a content of EO of from about 18 to about 22% by weight.

In one embodiment, polymers P have a molar mass MW of from about 2000 to about 6000 g/mol and an EO content of from about 5 to about 15% by weight.

In one embodiment, polymers P have a molar mass MW of from about 2000 to about 6000 g/mol and an EO content of from about 8 to about 12% by weight.

In one embodiment, polymers P have a molar mass MW of from about 2000 to about 6000 g/mol and an EO content of from about 15 to about 25% by weight.

In one embodiment, polymers P have a molar mass MW of from about 2000 to about 6000 g/mol and an EO content of from about 18 to about 22% by weight.

In one embodiment, polymers P have a molar mass MW of from about 2000 to about 4000 g/mol and an EO content of from about 5 to about 15% by weight.

In one embodiment, polymers P have a molar mass MW of from about 2000 to about 4000 g/mol and an EO content of from about 8 to about 12% by weight.

In one embodiment, polymers P have a molar mass MW of from about 2000 to about 4000 g/mol and an EO content of from about 15 to about 25% by weight.

In one embodiment, polymers P have a molar mass MW of from about 2000 to about 4000 g/mol and an EO content of from about 18 to about 22% by weight.

In one embodiment, polymers P have a molar mass MW of from about 2000 to about 2950 g/mol and an EO content of from about 5 to about 15% by weight.

In one embodiment, polymers P have a molar mass MW of from about 2000 to about 2950 g/mol and an EO content of from about 8 to about 12% by weight.

In one embodiment, polymers P have a molar mass MW of from about 2000 to about 2950 g/mol and an EO content of from about 15 to about 25% by weight.

In one embodiment, polymers P have a molar mass MW of from about 2000 to about 2950 g/mol and an EO content of from about 18 to about 22% by weight.

In one embodiment, polymers P have a molar mass MW of from about 2100 to about 2500 g/mol and an EO content of from about 5 to about 15% by weight.

In one embodiment, polymers P have a molar mass MW of from about 2100 to about 2500 g/mol and an EO content of from about 8 to about 12% by weight.

In one embodiment, polymers P have a molar mass MW of from about 2100 to about 2500 g/mol and an EO content of from about 15 to about 25% by weight.

In one embodiment, polymers P have a molar mass MW of from about 2100 to about 2500 g/mol and an EO content of from about 18 to about 22% by weight.

In one embodiment, polymers P have a molar mass MW of from about 3000 to about 4000 g/mol and an EO content of from about 5 to about 15% by weight.

In one embodiment, polymers P have a molar mass MW of from about 3000 to about 4000 g/mol and an EO content of from about 8 to about 12% by weight.

In one embodiment, polymers P have a molar mass MW of from about 3000 to about 4000 g/mol and an EO content of from about 15 to about 25% by weight.

In one embodiment, polymers P have a molar mass MW of from about 3000 to about 4000 g/mol and an EO content of from about 18 to about 22% by weight.

The synthesis of polyalkyleneoxides is known to the skilled worker. Details are given, for example, in "*Polyoxyalkylenes*" in Ullmann's Encyclopedia of Industrial Chemistry, 6$^{th}$ Edition, Electronic Release.

Block copolymer P can in one embodiment be prepared by base-catalyzed alkoxylation. For this purpose, the alcohol $R^1$—OH can be admixed in a pressurized reactor with alkali metal hydroxides, preferably potassium hydroxide, or with alkali metal alkoxides such as, for example, sodium methylate. By employing reduced pressure (for example <100 mbar) and/or by increasing the temperature (from about 30 to about 150° C.), water or Methanol still present in the mixture can be removed. The alcohol is then present as the corresponding alkoxide. Thereafter, inert conditions are established with inert gas (e.g. nitrogen) and the alkylene oxide or oxides is/are added stepwise at temperatures of from about 60 to about 180° C. up to a pressure of not more than 10 bar. At the end of the reaction, the catalyst can be neutralized by addition of acid (e.g. acetic acid or phosphoric acid) and can, if required, be filtered off. It can also be removed using an ion exchanger based on magnesium-silicate. By employing this method, polyalkylene oxides having the preferred polydispersity of from about 1.04 to about 1.2 can readily be obtained.

The alkoxylation of the alcohols can, however, also be carried out by employing other methods, for example by acid-catalyzed alkoxylation. Furthermore, for example, double hydroxide clays, as described in DE 43 25 237 A1, can be employed or double metal cyanide catalysts (DMC catalysts) can be used. Suitable DMC catalysts are disclosed, for example, in DE 102 43 361 A1, in particular paragraphs [0029] to [0041] and in the literature cited therein. For example, catalysts of the Zn—Co type can be used. For carrying out the reaction, the catalyst can be added to the alcohol $R^1$—OH and the mixture can be dewatered as described above and reacted with the alkylene oxides as described. Usually, not more than 1000 ppm of catalyst, based on the mixture, are used and, owing to this small amount, the catalyst can remain in the product. The amount of catalyst may as a rule be less than 1000 ppm, for example 250 ppm or less.

Block copolymer P is comprised in formulations F in an amount of from about 50 to about 90 by weight, preferably from about 60 to about 80%. All percentages, parts or ppm given herein are percent, parts or ppm by weight unless stated otherwise. All percentages relating to components A), B), C) and D) of formulation F given herein are given relative to the formulation F. All percentages relating to components C1), C2), C3) of composition C given herein are given relative to composition C).

Alkyl Sulfate S is a monoester of sulfuric acid. Preferably, alkyl sulfate S is a $C_6$ to $C_{20}$-alkyl sulfate.

Preferably, alkyl sulfate S is salt of a monoester of sulfuric acid. More preferably, alkyl sulfate S is a sodium, potassium, calcium or magnesium salt of a monoester of sulfuric acid.

Preferably, alkylsulfate S is a sodium salt of a monoester of sulfuric acid.

Especially preferred alkyl sulfates S are sodium lauryl sulfate, potassium lauryl sulfate and ammonium lauryl sulfate.

In one particularly preferred embodiment, alkyl sulfate S is sodium lauryl sulfate.

Alkyl sulfate S in normally comprised in formulation F in an amount of from about 0.5 to about 10% by weight.

Composition C comprises from about 5 to about 10% by weight relative to composition C) of at least one polydimethylsiloxane C1) bearing only terminal alkyl groups.

Composition C) further comprises from about 1 to about 3% by weight of at least one polydimethylsiloxane C2) bearing at least alkoxylated hydroxy group. The alkoxylated hydroxy group is typically bonded to a silicon atom of a siloxane group. Typically, the alkoxylated hydroxy group may be bonded to a silicon atom of a siloxane group at any position in the polydimethylsiloxane, preferably at a terminal position of the polydimethylsiloxane.

Composition C) further comprises at least one solvent C3) capable of dissolving components C1) and C2) in the amounts given and miscible with components A), B) and D) in the amounts given. Solvent C3) is normally different from water. In another form composition C) comprises a solvent C3). In another form composition C) comprises one solvent C3).

In one preferred embodiment solvent C3) is 1-isopropyl-2,2-dimethyltrimethylenediisobutyrate.

Preferably solvent C3) is comprised in composition C) in an amount of from about 75 to about 80% by weight based on composition C). In another preferred form solvent C3) is comprised in composition C) in an amount of from about 75 to about 85% by weight based on composition C).

Components A), B) and C) are comprised in formulation F in the amounts given above.

Formulation F is an aqueous formulation. This means that formulation F comprises water as a solvent. Preferably, the at least one solvent comprised in formulation F comprises at least about 50, more preferably at least about 80% or about 99% by weight of water.

Preferably, formulation F comprises from about 10 to about 49.5% by weight of water.

In one embodiment formulation F consists essentially of components A), B) and C) and water.

In one embodiment formulation F consists of components A), B) and C) and water.

In one embodiment formulation F consists essentially of
A) from about 50 to about 90 parts by weight of at least one block copolymer P of ethyleneoxide and propylene oxide,
B) from about 0.5 to about 10 parts by weight of at least one salt of an alkyl sulfate S,
C) from about 0.05 to about 0.5 parts by weight of a composition C comprising
  C1) from about 5 to about 10 parts by weight of at least one polydimethylsiloxane bearing only terminal alkyl groups,
  C2) from about 1 to about 3 parts by weight of at least one polydimethylsiloxane bearing at least one alkoxylated hydroxy group,
  C3) at least one solvent,
D) Water.

In one embodiment formulation F consists of
A) from about 50 to about 90 parts by weight of at least one block copolymer P of ethyleneoxide and propylene oxide,
B) from about 0.5 to about 10 parts by weight of at least one salt of an alkyl sulfate S,
C) from about 0.05 to about 0.5 parts by weight of a composition C comprising
  C1) from about 5 to about 10 parts by weight of at least one polydimethylsiloxane bearing only terminal alkyl groups,
  C2) from about 1 to about 3 parts by weight of at least one polydimethylsiloxane bearing at least one alkoxylated hydroxy group,
  C3) at least one solvent,
D) Water.

In one embodiment formulation F consists of
A) from about 50 to about 90 parts by weight of at least one block copolymer P of ethyleneoxide and propylene oxide with a molar mass MW of 2000 to 2950 g/mol and an EO content of about 20% by weight,
B) from about 0.5 to about 10 parts by weight of at least one salt of an alkyl sulfate S,
C) from about 0.05 to about 0.5 parts by weight of a composition C comprising
  C1) from about 5 to about 10 parts by weight of at least one polydimethylsiloxane bearing only terminal alkyl groups,
  C2) from about 1 to about 3 parts by weight of at least one polydimethylsiloxane bearing at least one alkoxylated hydroxy group,
  C3) at least one solvent,
D) Water.

In one embodiment formulation F consists of
A) from about 50 to about 90 parts by weight of at least one block copolymer P of ethyleneoxide and propylene oxide with a molar mass MW of 2000 to 2950 g/mol and an EO content of about 20% by weight,
B) from about 0.5 to about 10 parts by weight of at least one salt of an alkyl sulfate S,
C) from about 0.05 to about 0.5 parts by weight of a composition C comprising
   C1) from about 5 to about 10 parts by weight of at least one polydimethylsiloxane bearing only terminal alkyl groups,
   C2) from about 1 to about 3 parts by weight of at least one polydimethylsiloxane bearing at least one alkoxylated hydroxy group,
   C3) at least one solvent,
D) Water.

In one embodiment formulation F consists of
A) from about 60 to about 80 parts by weight of at least one block copolymer P of ethyleneoxide and propylene oxide with a molar mass MW of 2000 to 2950 g/mol and an EO content of about 20% by weight,
B) from about 0.5 to about 10 parts by weight of at least one salt of an alkyl sulfate S,
C) from about 0.05 to about 0.5 parts by weight of a composition C comprising
   C1) from about 5 to about 10 parts by weight of at least one polydimethylsiloxane bearing only terminal alkyl groups,
   C2) from about 1 to about 3 parts by weight of at least one polydimethylsiloxane bearing at least one alkoxylated hydroxy group,
   C3) at least one solvent,
D) Water.

In one embodiment formulation F consists essentially of
A) from about 50 to about 90% by weight of at least one block copolymer P of ethyleneoxide and propylene oxide,
B) from about 0.5 to about 10% by weight sodium lauryl sulfate,
C) from about 0.05 to about 0.5% by weight of a composition C comprising
   C1) from about 5 to about 10% by weight of at least one polydimethylsiloxane bearing only terminal alkyl groups,
   C2) from about 1 to about 3% by weight of at least one polydimethylsiloxane bearing at least one alkoxylated hydroxy group,
   C3) at least one solvent,
D) from about 10 to about 49.45% by weight of water.

In one embodiment formulation F consists of
A) from about 50 to about 90% by weight of at least one block copolymer P of ethyleneoxide and propylene oxide,
B) from about 0.5 to about 10% by weight of at least one salt of an alkyl sulfate S,
C) from about 0.05 to about 0.5% by weight of a composition C comprising
   C1) from about 5 to about 10% by weight of at least one polydimethylsiloxane bearing only terminal alkyl groups,
   C2) from about 1 to about 3% by weight of at least one polydimethylsiloxane bearing at least one alkoxylated hydroxy group,
   C3) at least one solvent,
D) from about 10 to about 49.45% by weight of water.

In one embodiment formulation F consists of
A) from about 50 to about 90% by weight of at least one block copolymer P of ethyleneoxide and propylene oxide with a molar mass MW of 2000 to 2950 g/mol and an EO content of 20% by weight,
B) from about 0.5 to about 10% by weight of at least one salt of an alkyl sulfate S,
C) from about 0.05 to about 0.5% by weight of a composition C comprising
   C1) from about 5 to about 10% by weight of at least one polydimethylsiloxane bearing only terminal alkyl groups,
   C2) from about 1 to about 3% by weight of at least one polydimethylsiloxane bearing at least one alkoxylated hydroxy group,
   C3) at least one solvent,
D) from about 10 to about 49.45% by weight of water.

Formulations F are easy and economical to make.

Formulations F are stable mixtures that do not show phase separation over long periods of time at room temperature as well as at elevated temperatures like 40° C. or 60° C.

They allow effective and efficient control of foam formation at low concentrations of the defoamer.

Formulations F are miscible with water and yield clear mixtures at the concentrations used in desalination applications.

Formulations F are especially useful in thermal desalination processes of water, especially of seawater or brackish water.

Another aspect of the present disclosure is the use of a formulation F comprising
A) from about 50 to about 90 parts by weight of at least one nonionic surfactant different from siloxanes,
B) Optionally from about 0.1 to about 10 parts by weight of at least one salt of alkyl sulfate S,
C) from about 0.05 to about 0.5 parts by weight of a composition C comprising
   C1) from about 5 to about 10% by weight of at least one polydimethylsiloxane bearing only terminal alkyl groups,
   C2) from about 1 to about 3% by weight of at least one polydimethylsiloxane bearing at least one alkoxylated hydroxy group,
   C3) at least one solvent,
D) water,
   wherein formulation F is an aqueous formulation, as an antifoam agent, preferably in thermal desalination applications.

In one embodiment formulations F are used as an antifoam agent, preferably in thermal desalination applications and comprise
A) from about 50 to about 90% by weight of at least one nonionic surfactant different from siloxanes,
B) Optionally from about 0.1 to about 10% by weight of at least one salt of alkyl sulfate S,
C) from about 0.05 to about 0.5% by weight of a composition C comprising
   C1) from about 5 to about 10% by weight of at least one polydimethylsiloxane bearing only terminal alkyl groups,
   C2) from about 1 to about 3% by weight of at least one polydimethylsiloxane bearing at least alkoxylated hydroxy group,
   C3) at least one solvent,
D) from about 10 to about 49.95% by weight of water.

Another aspect of the present disclosure is the use of an aqueous formulation F comprising
- A) from about 50 to about 90 parts by weight of at least one block copolymer P of ethyleneoxide and propylene oxide,
- B) from about 0.5 to about 10 parts by weight of at least one salt of alkyl sulfate S,
- C) from about 0.05 to about 0.5 parts by weight of a composition C comprising
  - C1) from about 5 to about 10% by weight of at least one polydimethylsiloxane bearing only terminal alkyl groups,
  - C2) from about 1 to about 3% by weight of at least one polydimethylsiloxane bearing at least one alkoxylated hydroxy group,
  - C3) at least one solvent,
- D) Water, as an antifoam agent, preferably in thermal desalination applications.

Another aspect of the present disclosure is the use of a formulation F comprising
- A) from about 50 to about 90% by weight of at least one block copolymer P of ethyleneoxide and propylene oxide,
- B) from about 0.5 to about 10% by weight of at least one salt of alkyl sulfate S,
- C) from about 0.05 to about 0.5% by weight of a composition C comprising
  - C1) from about 5 to about 10% by weight of at least one polydimethylsiloxane bearing only terminal alkyl groups,
  - C2) from about 1 to about 3% by weight of at least one polydimethylsiloxane bearing at least one alkoxylated hydroxy group,
  - C3) at least one solvent,
- D) from about 10 to about 49.45% by weight of water, as an antifoam agent, preferably in thermal desalination applications.

Formulations F are in particular useful in thermal desalination processes of seawater.

In one embodiment, formulations F are used in multi effect distillations (MED).

In one embodiment, formulations F are used in multistage effect distillation (MSF).

In one embodiment, formulations F are used in mechanical vapor compression (MVC) processes.

In one embodiment, formulations F are used in combinations of mechanical vapor compression (MVC) processes and multi effect distillations (MED)

Formulations F are normally added to the feed water in thermal desalination processes in an amount of from about 0.01 to about 2 ppm by weight, based on the feed water.

In one embodiment, formulations F are added to the feed water in thermal desalination processes in an amount that results in a concentration of block copolymer P of from about 0.005 to about 2 ppm by weight based on the feed water, preferably from about 0.007 to about 1.4 ppm.

The use of formulation F essentially suppresses the formation of foam and leads to higher production rates.

Formulations F are easily miscible with water and yield clear mixture that do not show phase separation at room temperature or at elevated temperature, e.g. between about 20 and about 40 or between about 20 and about 60° C. over a long time, for example for one hour, six hours, day, one week or one month. In particular, formulations F can be mixed with water at the concentrations applied during thermal desalination processes and do not show phase separation during the application of the process.

Formulations F are further miscible with other additives used in the thermal desalination of water like polyacrylic acid, copolymers or terpolymers of acrylic acid, polymaleic acid and copolymers or terpolymers of maleic acid, copolymers of maleic acid and alkylenes like isobutene, phosphonates e.g. 2-Phosphonobutane-1,2,4-tricarboxylic acid (PBTC), 1-Hydroxyethane-1,1-diphosphonic acid (HEDP), Amino tris(methylene phosphonic acid) (ATMP), Diethylenetriamine penta(methylene phosphonic acid) (DTPMP), Hexamethylenediamine tetra(methylene phosphonic acid) (HDTMP), ethylenediamine tetra(methylene phosphonic acid) (EDTMP), sodium bisulfite ($NaHSO_3$), Sodium metabisulfite ($Na_2S_2O_5$) and mixtures thereof.

Formulations F are easily biodegradable.

Experiments

Materials Used:

Block copolymer P1: block copolymer of ethylene oxide and propylene oxide with the structure PEO-PPO-PEO with an average molar mass MW of 2300 g/mol, as calculated from the OH number determined according to DIN 53240-1:2013-06

Block copolymer P2: block copolymer of ethylene oxide and propylene oxide with the structure PEO-PPO-PEO with an average molar mass Mw of 1000 g/mol (content EO in the molecule is 10%)

Block copolymer P3: block copolymer of ethylene oxide and propylene oxide with the structure PEO-PPO-PEO with an average molar mass Mw of 2000 g/mol (content EO in the molecule is 10%)

Block copolymer P4: block copolymer of ethylene oxide and propylene oxide with the structure PEO-PPO-PEO with an average molar mass Mw of 2450 (content EO in the molecule is 20%)

Block copolymer P5: block copolymer of ethylene oxide and propylene oxide with the structure PEO-PPO-PEO with an average molar mass Mw of 2600 (content EO in the molecule is 10%)

Block copolymer P6: block copolymer of ethylene oxide and propylene oxide with the structure PEO-PPO-PEO with an average molar mass Mw of 3650 (content EO in the molecule is 20%)

Solubilizer 1: Hydrogenated castor oil, ethoxylated (PEG 40)

Solubilizer 2: castor oil, hydrogenated, ethoxylated (PEG 60)

Solubilizer 3: Polyoxyethylene sorbitan monostearate (20 EO)

Solubilizer 4: polyethylene glycol with $M_w$=200 g/mol

Solubilizer 5: polyoxyethylene (20) sorbitan monooleate

Solubilizer 6: Phosphoric acid ester of a fatty alcohol ethoxylate/propoxylate

Solubilizer 7: sodium lauryl sulfate

Solubilizer 8: >=50% and <75 wt. % solution in water of $C_{10-13}$-alkyl benzenesulfonate sodium salt Solubilizer 9: Aqueous solution based on: Alcohols, $C_{12-14}$, ethoxylated, sulfates, sodium salts (>1<2.5 mol EO)

Composition C.A: Composition Comprising
1. 5-10 wt. % polydimethylsiloxane bearing only terminal methyl groups
2. 1-3 wt. % of polydimethylsiloxane bearing alkoxylated hydroxy groups
3. 75-84 wt. % of 1-isopropyl-2,2-dimethyltrimethylene diisobutyrate Composition C.B: Composition Comprising:
1. 1-5 wt. % by weight of silane, dichlorodimethyl-, reaction products with silica, CAS No. 68611-44-9
2. 0.1 to 0.5 wt. % 4-methylmorpholine, CAS-No. 109-02-4

A. Compatibility of Block Copolymers P and Solubilizers

Mixing of the initial solutions and afterwards storage of the 2 wt. % test mixtures at room temperature and 60° C. for 24 hours in 50 mL glass bottles with snap-on caps.

Mixtures of block copolymers P1 to P6 with solubilizers 1 to solubilizer 9 at varying concentrations were prepared and the screening of their stability as of 2 weight (wt) % mixtures in water at room temperature and at 60° C. was performed.

The 2 wt % water mixtures that were clear or opalescent, without phase separation both at room temperature and at 60° C. are the mixtures of block copolymer P4 and the following solubilizers: solubilizer 6, solubilizer 7, solubilizer 8, solubilizer 9.

The chosen mixtures were further tested to optimize the ratio between block copolymer P, solubilizer and water content.

B. Stability of Mixtures

Antifoam formulations were prepared according to the following procedure with the type of component and their amount being given in table 1:

In a reactor with mechanical stirrer, 686.0 g block copolymer P was added. The product was stirred with 180 rpm at 23° C. A mixture of 4.9 g solubilizer and 14.7g water were added continuously over 15 minutes. After that 274.3 g water were added continuously over 30 minutes. Furthermore 1.0 g of composition C were added continuously over 5 minutes and the dosing equipment was rinsed with 20.0 g water over 5 minutes. The resulting product was filtered over a 620 μm sieve.

TABLE 1

Compositions of formulations prepared in examples B.1 to B.8.

| Example | Block copolymer P | Content block copolymer P [wt. %] | Solubilizer | Solubilizer content [wt. %] | Antifoam composition C | Content Composition C [wt %] | Water [wt. %] |
|---|---|---|---|---|---|---|---|
| B.1 | P4 | 68.6 | 6 | 1.96 | C.B | 0.1 | 29.34 |
| B.2 | P4 | 68.6 | 6 | 1.96 | C.A | 0.1 | 29.34 |
| B.3 | P4 | 68.6 | 7 | 1.96 | C.B | 0.1 | 29.34 |
| B.4 | P4 | 68.6 | 7 | 1.96 | C.A | 0.1 | 29.34 |
| B.5 | P4 | 68.6 | 8 | 1.96 | C.B | 0.1 | 29.34 |
| B.6 | P4 | 68.6 | 8 | 1.96 | C.A | 0.1 | 29.34 |
| B.7 | P4 | 68.6 | 9 | 1.96 | C.B | 0.1 | 29.34 |
| B.8 | P4 | 68.6 | 9 | 1.96 | C.A | 0.1 | 29.34 |

Stability Test

Mixtures comprising 1, 2, 5, 7.5 and 10 wt % of formulations according to examples B.1 to B.8 in deionized water were prepared.

The mixtures so prepared were stored for one week at different temperatures in 50 mL glass bottles with snap-on caps. After one week the stability of the mixtures was evaluated by their outer appearance. Results are given in table 2.

TABLE 2

Stability of aqueous mixtures of formulations according to example B.1 to B.8.;

| | wt. % | 4° C. | 23° C. | 40° C. | 60° C. |
|---|---|---|---|---|---|
| Example B.1 | 1 | ○ | + | + | ○ |
| | 2 | # | + | ○ | ○ |
| | 5 | # | # | ○ | ○ |
| | 7.5 | # | # | ○ | ○ |
| | 10 | # | # | − | − |
| Example B.2 | 1 | # | + | + | ○ |
| | 2 | # | + | ○ | ○ |
| | 5 | # | # | ○ | ○ |
| | 7.5 | # | # | − | − |
| | 10 | # | # | − | − |
| Example B.3 | 1 | + | + | # | ○ |
| | 2 | + | + | # | ○ |
| | 5 | + | + | # | ○ |
| | 7.5 | # | # | # | ○ |
| | 10 | # | # | # | − |
| Example B.4 | 1 | + | + | + | ○ |
| | 2 | + | + | + | ○ |
| | 5 | + | + | + | ○ |
| | 7.5 | + | + | + | − |
| | 10 | ○ | + | + | − |
| Example B.5 | 1 | # | # | # | ○ |
| | 2 | # | # | − | ○ |
| | 5 | − | − | − | ○ |
| | 7.5 | − | − | − | ○ |
| | 10 | − | − | − | − |
| Example B.6 | 1 | # | ○ | # | ○ |
| | 2 | # | ○ | # | ○ |
| | 5 | # | − | # | ○ |
| | 7.5 | # | − | # | − |
| | 10 | # | − | # | − |
| Example B.7 | 1 | + | + | ○ | ○ |
| | 2 | + | + | − | ○ |
| | 5 | # | # | − | ○ |
| | 7.5 | # | # | − | ○ |
| | 10 | # | # | − | − |
| Example B.8 | 1 | + | + | ○ | ○ |
| | 2 | + | + | ○ | ○ |
| | 5 | # | # | # | − |
| | 7.5 | # | # | # | − |
| | 10 | # | # | # | − |

+ = clear, no sedimentation
○ = opalescent or milky translucent
# = suspended solids
− = phase separation, sedimentation Formulation prepared according to Experiment B.4 turned out to have the highest stability of all formulations.

The formulation from experiment B.4 stayed clear, without phase separation, at 4° C., room temperature and at 40° C. All other mixtures became milky and showing sedimentations or phase separation at a certain point.

C. Performance

Foam tube testing to evaluate the performance of foam destruction and foam prevention in thermal desalination processes.

1. Composition of Synthetic Seawater

| Component | Concentration in [g per liter] |
|---|---|
| NaCl | 30.762 |
| $Na_2SO_4$ | 5.153 |
| KCl | 0.870 |
| $NaHCO_3$ | 0.252 |
| KBr | 0.126 |
| $H_3BO_3$ | 0.033 |
| NaF | 0.004 |
| $MgCl_2 * 6H_2O$ | 13.926 |
| $CaCl_2 * 2H_2O$ | 1.953 |
| $SrCl_2 * 6H_2O$ | 0.031 |
| Casein | 0.003 |
| Gelatin | 0.015 |
| Starch | 0.015 |
| Lutensol ® TO 20 | 0.015 |

Lutensol TO 20 is an ethoxylate of isotridecanol bearing a number average of 20 EO units.

Figure 1:
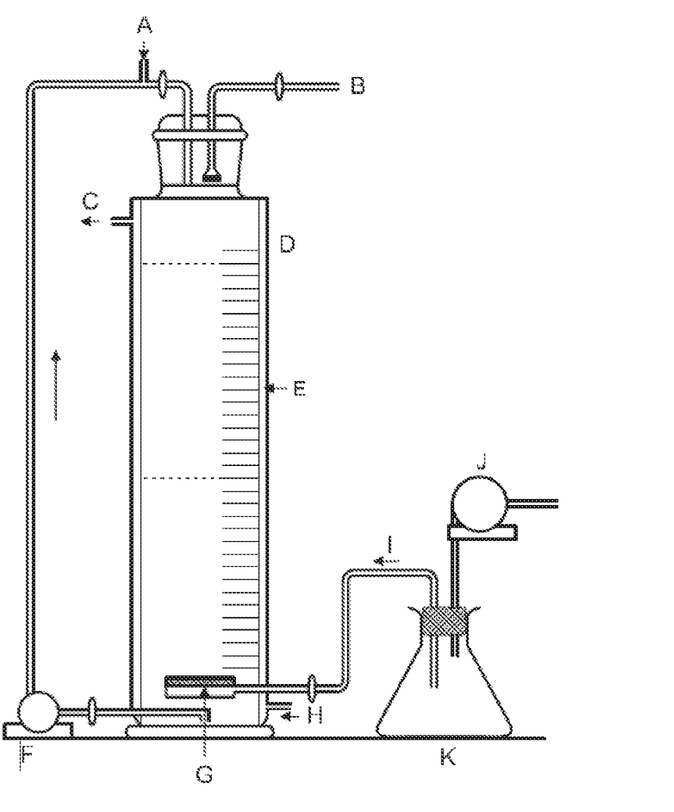
FIG. 1 is a schematic representation of a glass foam tube setup within which desalination processes can be conducted.

The evaluation of the performance of formulations F as defoamer in desalination processes for sweater was tested using glass foam tube setup as shown in FIG. 1 with the following meaning of the captions:
A: Bypass for dosing antifoam
B: Flushing Supply for cleaning
C: Thermostat exit
D: 1000 ml graduated glass cylinder
E: heatable double wall test cylinder
F: Circulation Pump
G: Frit
H: Theromostate entry
I: Air Outlet
J: Air pump
K: Woulf Bottle For testing the foam prevention and the foam destuction, the following parameters were applied to the foam tube:
Air flow=294 ml/min;
Liquid flow=4.3 L/min;
T=90° C.; Recirculation mode 10 μl of 2 wt % mixtures of the tested formulations were added to the synthetic seawater after the foam level in the test cylinder D reached 1000 ml.

The results are given in table 3.

TABLE 3

Results of the foam prevention and foam destruction test according to example C.

| Time, s | Blank foam, ml | Block copolymer P1 foam, ml | Example B.4 foam, ml |
|---|---|---|---|
| −90 | 0 | 0 | 0 |
| −80 | 130 | 130 | 130 |
| −70 | 220 | 220 | 220 |
| −60 | 280 | 280 | 280 |
| −50 | 330 | 330 | 330 |
| −40 | 360 | 360 | 360 |
| −30 | 410 | 410 | 410 |
| 0 | 500 | 500 | 500 |
| 60 | 490 | 300 | 300 |
| 120 | 500 | 280 | 100 |
| 180 | 490 | 140 | 70 |
| 240 | 490 | 130 | 60 |
| 300 | 500 | 125 | 110 |
| 360 | 500 | 140 | 110 |
| 420 | 490 | 150 | 90 |
| 480 | 500 | 150 | 100 |
| 540 | 490 | 150 | 100 |
| 600 | 490 | 150 | 100 |
| 660 | 500 | 150 | 100 |
| 720 | 500 | 150 | 100 |
| 780 | 490 | 150 | 110 |
| 840 | 490 | 150 | 120 |

The formulation according example B.4 turned out to be more effective for preventing and deleting foam that the comparative examples.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

The invention claimed is:

1. A formulation comprising:
   A) 50 to 90 parts by weight, based on the total weight of the formulation, of at least one block copolymer of ethyleneoxide and propylene oxide,
   B) 0.5 to 10 parts by weight, based on the total weight of the formulation, of at least one salt of an alkyl sulfate,
   C) 0.05 to 0.5 parts by weight, based on the total weight of the formulation, of a composition comprising
      C1) 5 to 10 parts by weight, based on the total weight of the composition, of at least one polydimethylsiloxane bearing only terminal alkyl groups,
      C2) 1 to 3 parts by weight, based on the total weight of the composition, of at least one polydimethylsiloxane bearing at least one alkoxylated hydroxy group,
      C3) at least one solvent, wherein said formulation is an aqueous formulation.

2. A formulation according to claim 1, wherein said at least one alkyl sulfate is sodium lauryl sulfate.

3. A formulation according to claims 1, wherein said block copolymer has an average molar mass Mw of from about 1000 to about 6000.

4. A formulation according to claim 1, wherein said block copolymer has the structure (EO)x(PO)y(EO)x, with x and y being independently from about 1 to about 200.

5. A formulation according to claim 1, wherein said composition comprises:
C3) from about 75 to about 80% by weight of 1-isopropyl-2,2-dimethyltrimethylene diisobutyrate.

6. A formulation comprising
A) from about 50 to about 90% by weight, based on the total weight of the formulation, of at least one block copolymer of ethyleneoxide and propylene oxide,
B) from about 0.5 to about 10% by weight, based on the total weight of the formulation, of at least one salt of an alkyl sulfate,
C) from about 0.05 to about 0.5% by weight, based on the total weight of the formulation, of a composition comprising
   C1) from about 5 to about 10% by weight, based on the total weight of the composition, of at least one polydimethylsiloxane bearing only terminal alkyl groups,
   C2) from about 1 to about 3% by weight, based on the total weight of the composition, of at least one polydimethylsiloxane bearing at least one alkoxylated hydroxy group,
   C3) at least one solvent,
D) from about 10 to about 49.45% by weight, based on the total weight of the formulation, of water.

7. A desalination method comprising adding a formulation to feed water of a thermal desalination process, wherein the formulation comprises:
A) from about 50 to about 90 parts by weight, based on the total weight of the formulation, of at least one nonionic surfactant different from siloxanes,
B) Optionally from about 0.1 to about 10 parts by weight, based on the total weight of the formulation, of at least one salt of alkyl sulfate,
C) from about 0.05 to about 0.5 parts by weight of a composition comprising
   C1) from about 5 to about 10% by weight, based on the total weight of the composition, of at least one polydimethylsiloxane bearing only terminal alkyl groups,
   C2) from about 1 to about 3% by weight, based on the total weight of the composition, of at least one polydimethylsiloxane bearing at least one alkoxylated hydroxy group,
   C3) at least one solvent, and
D) water.

8. The method according to claim 7, wherein said formulation comprises
A) from about 50 to about 90% by weight, based on the total weight of the formulation, of at least one block copolymer of ethyleneoxide and propylene oxide,
B) from about 0.5 to about 10% by weight, based on the total weight of the formulation of at least one salt of alkyl sulfate,
C) from about 0.05 to about 0.5% by weight of a compositionComposition comprising
   C1) from about 5 to about 10% by weight, based on the total weight of the composition, of at least one polydimethylsiloxane bearing only terminal alkyl groups,
   C2) from about 1 to about 3% by weight, based on the total weight of the composition, of at least one polydimethylsiloxane bearing at least one alkoxylated hydroxy group,
   C3) at least one solvent, and
D) from about 10 to about 49.45% by weight of water.

9. The method according to claim 7, wherein said method comprises adding the formulation during a thermal desalination process of water.

* * * * *